(12) United States Patent
Ganapathy

(10) Patent No.: US 9,148,815 B2
(45) Date of Patent: Sep. 29, 2015

(54) SYSTEMS AND METHODS FOR ROUTING CELLULAR NETWORK CALLS OR DATA USING A COMMUNICATIONS DEVICE

(71) Applicant: American Megatrends, Inc., Norcross, GA (US)

(72) Inventor: Narayanaswami Ganapathy, Newark, CA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 165 days.

(21) Appl. No.: 13/832,000

(22) Filed: Mar. 15, 2013

(65) Prior Publication Data

US 2014/0274071 A1    Sep. 18, 2014

(51) Int. Cl.
*H04W 40/00* (2009.01)
*H04W 28/02* (2009.01)
*H04W 88/04* (2009.01)

(52) U.S. Cl.
CPC .......... *H04W 28/0205* (2013.01); *H04W 88/04* (2013.01)

(58) Field of Classification Search
USPC .......... 455/445, 11.1, 426.1, 404.2, 436, 513, 455/12.1, 13.1, 466, 417, 3.02, 3.01, 557, 455/88, 422.1; 370/315, 229, 238, 252; 379/219, 220.01; 710/310, 106, 2, 313, 710/306

See application file for complete search history.

(56) References Cited

U.S. PATENT DOCUMENTS

| | | | |
|---|---|---|---|
| 8,611,213 B1 * | 12/2013 | Lagar-Cavilla et al. | 370/229 |
| 2005/0113078 A1 * | 5/2005 | Deitrich | 455/417 |
| 2010/0234051 A1 * | 9/2010 | Holden et al. | 455/466 |
| 2014/0004865 A1 * | 1/2014 | Bhargava et al. | 455/445 |

* cited by examiner

*Primary Examiner* — Charles Appiah
*Assistant Examiner* — Alexander Yi
(74) *Attorney, Agent, or Firm* — Minh N. Nguyen; Next IP Law Group LLP

(57) ABSTRACT

A method, system and apparatus for providing better cellular network coverage and establishing a new cellular network technology infrastructure are provided. A representative apparatus is a communications device that includes a processing device, memory, a transceiver, and a miniature cellular tower unit. The memory includes a routing manager which has instructions that are executed by the processing device. The instructions include logics that facilitate making and receiving cellular network calls from and to the communications device. The transceiver transmits and receives radio frequency (RF) signals to and from a cellular tower and to and from at least one other communications device. The miniature cellular tower unit routes RF signals from the at least one other communications device to the cellular tower.

19 Claims, 11 Drawing Sheets

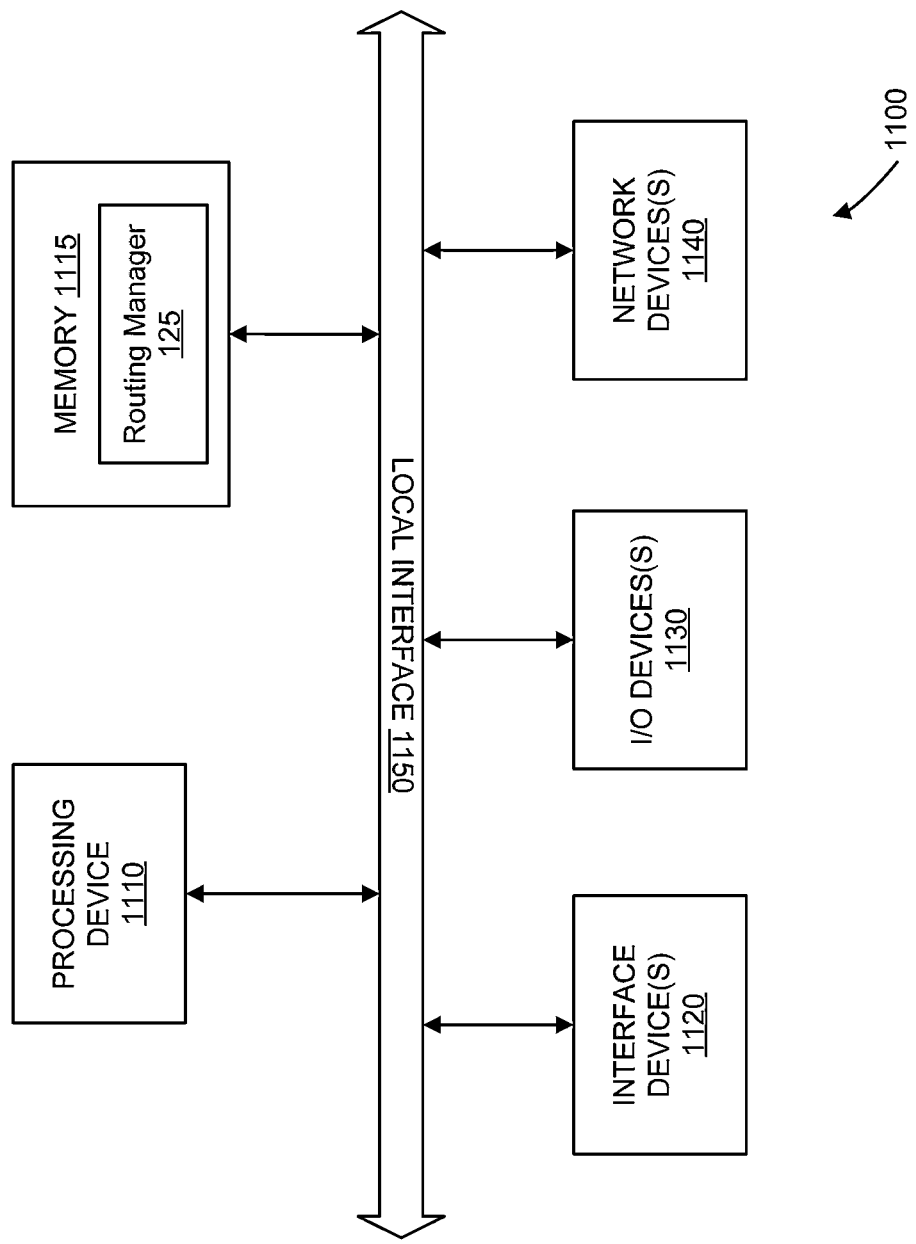

SYSTEMS AND METHODS FOR ROUTING CELLULAR NETWORK CALLS OR DATA USING A COMMUNICATIONS DEVICE

TECHNICAL FIELD

The present disclosure is generally related to communications devices and, more particularly, is related to systems and methods for routing cellular network calls or data using a communications device.

BACKGROUND

Usage of cellular phones has increased and has become the primary phone for individuals in a household. The number of mobile devices sold in a year has exceeded the number of personal computers sold. Social networks, gaming, business and personal use that are on the go have triggered a substantial increase in the usage of such devices. These devices are becoming more and more powerful and come in varying sizes, mostly smaller so that it can be hand held. Also, now IPV6 is becoming a standard as the internet protocols (IPs) of IPV4 have been exhausted. With the increases in many such devices, particularly mobile devices, the cellular network congestion has increased specially in densely populated areas resulting in dropped calls and intermittent access to the Internet through cellular network.

The cellular companies have been transitioning to newer and faster network technology infrastructure to provide better and faster service to its customers. The transition of newer and faster network technology infrastructure by the cellular companies takes time and monies to install and establish the new network infrastructure.

SUMMARY

A method, system and apparatus for providing better cellular network coverage and establishing a new cellular network technology infrastructure are provided. A representative apparatus is a communications device that includes a processing device, memory, a transceiver, and a miniature cellular tower unit. The memory includes a routing manager which has instructions that are executed by the processing device. The instructions include logics that facilitate making and receiving cellular network calls from and to the communications device. The transceiver transmits and receives radio frequency (RF) signals to and from a cellular tower and to and from at least one other communications device. The miniature cellular tower unit routes RF signals from the at least one other communications device to the cellular tower.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 11 is a block diagram illustrating an exemplary architecture for a generic computer that is similar to the architecture of the computing device, local server and central server, such as that shown in FIG. 5.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which cellular network calls or data are routed using a communications device.

Figure 1:
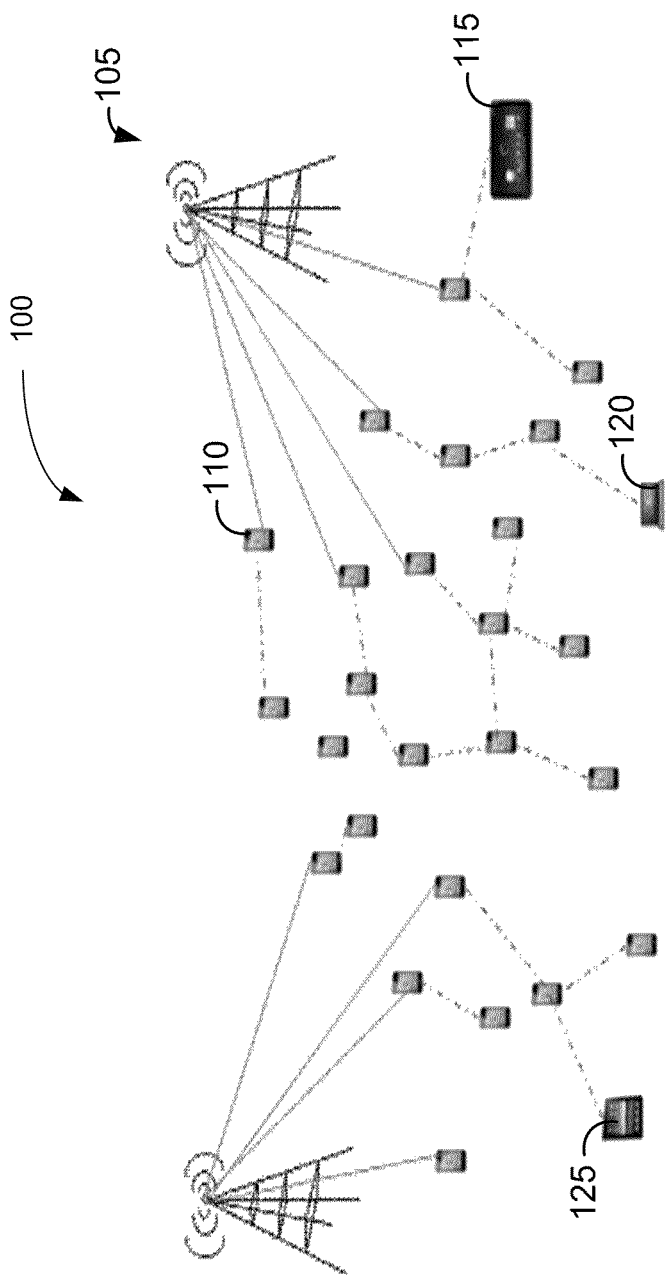
FIG. 1 is a block diagram that illustrates an embodiment of a system having a communications device that facilitates routing cellular network calls or data.

FIG. 1 is a block diagram that illustrates an embodiment of a system 100 having a communications device that facilitates routing cellular network calls or data. The system 100 can include a cellular network infrastructure 100 that includes a cellular tower 105 and at least one communications device 110. Such communications device 110 can include, but is not limited to, a cellular phone, a smart phone, a personal device assistant (PDA) devices, and among other hand-held devices.

The communications devices 110 communicate among each other and the cellular towers 105 to facilitate routing cellular network calls and data. The functionality and operation of the communications device 110 is further described below. The communications devices 110 can be connected to other computing devices, such as a desktop computer 115, a laptop 120, and a tablet 125. The communications devices 110 can route cellular network calls or data to these other computing devices.

Figure 2:
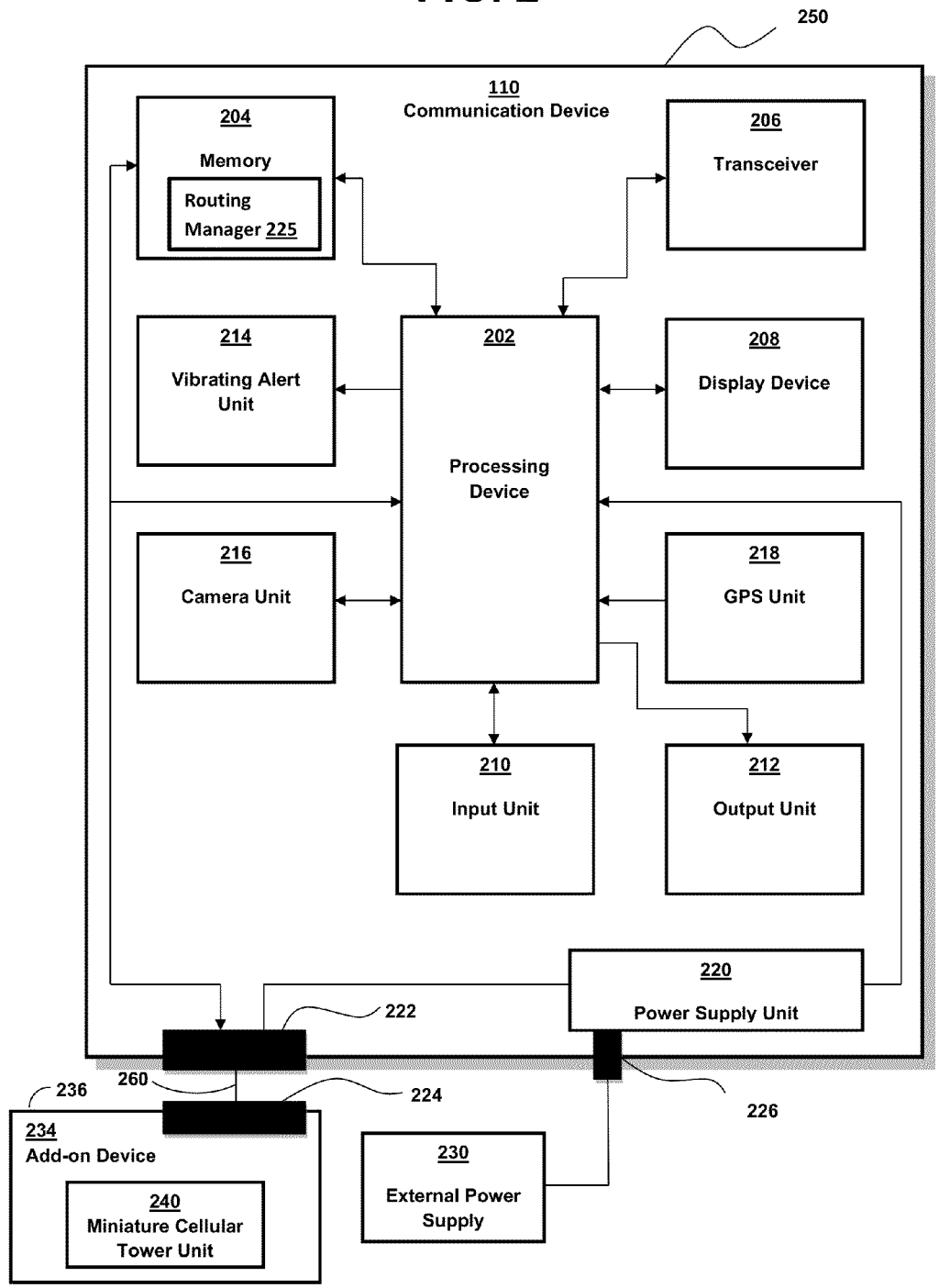
FIG. 2 is a block diagram that illustrates an embodiment of a communications device, such as that shown in FIG. 1.

FIG. 2 is a block diagram that illustrates an embodiment of a communications device 110, such as that shown in FIG. 1. The communications device 110 includes a processing device 202 and memory 204. Such memory 204 includes a routing manager 225 which has instructions that are executed by the processing device 202. The instructions including logics that facilitate making and receiving cellular network calls from and to the communications device. The communications device 110 further includes a transceiver 206 that transmits and receives radio frequency (RF) signals to and from the cellular tower 105 (FIG. 1) and to and from at least one other communications device 110.

In this example, a miniature cellular tower unit 240 is designed to be part of an add-on device 234, which is electrically coupled to the communications device 110 by way of a first data port 222 and a second data port 224, such as universal serial bus (USB) connectors, mini-USB connectors, micro-USB connectors, among others. The miniature cellular tower unit routes RF signals from the at least one other communications device 110 (FIG. 1) to the cellular tower 105. The routed RF signals are associated with the cellular network calls and cellular network data.

The first data port 222 is electrically coupled to the memory 204 and processing device 202 of the communications device 110 and connects to the second data port 224 of the miniature cellular tower unit 240 using a data cable 260. The add-on device 234 includes a housing 236 that contains the miniature cellular tower unit 240. The miniature cellular tower unit 240 can obtain its power from a power supply unit 220 of the communications device 110 via data ports 222, 224. The miniature cellular tower unit 224 is further described below.

The power supply unit 220 also provides power to at least a portion of the electrical components at the communications device 110, the electrical components of which include, but are not limited to, processing device 202, memory 204, transceiver 206, display device 208, input unit 210, output unit 212, vibrating alert unit 214, camera unit 216, GPS unit 218, and routing manager 225. An external power supply 230 can provide power to the communications device 110 and recharge the power supply unit 220 via power connector 226. It should be noted that a housing 250 of the communications device 110 contains at least a portion of the electrical components mentioned above.

Figure 3:
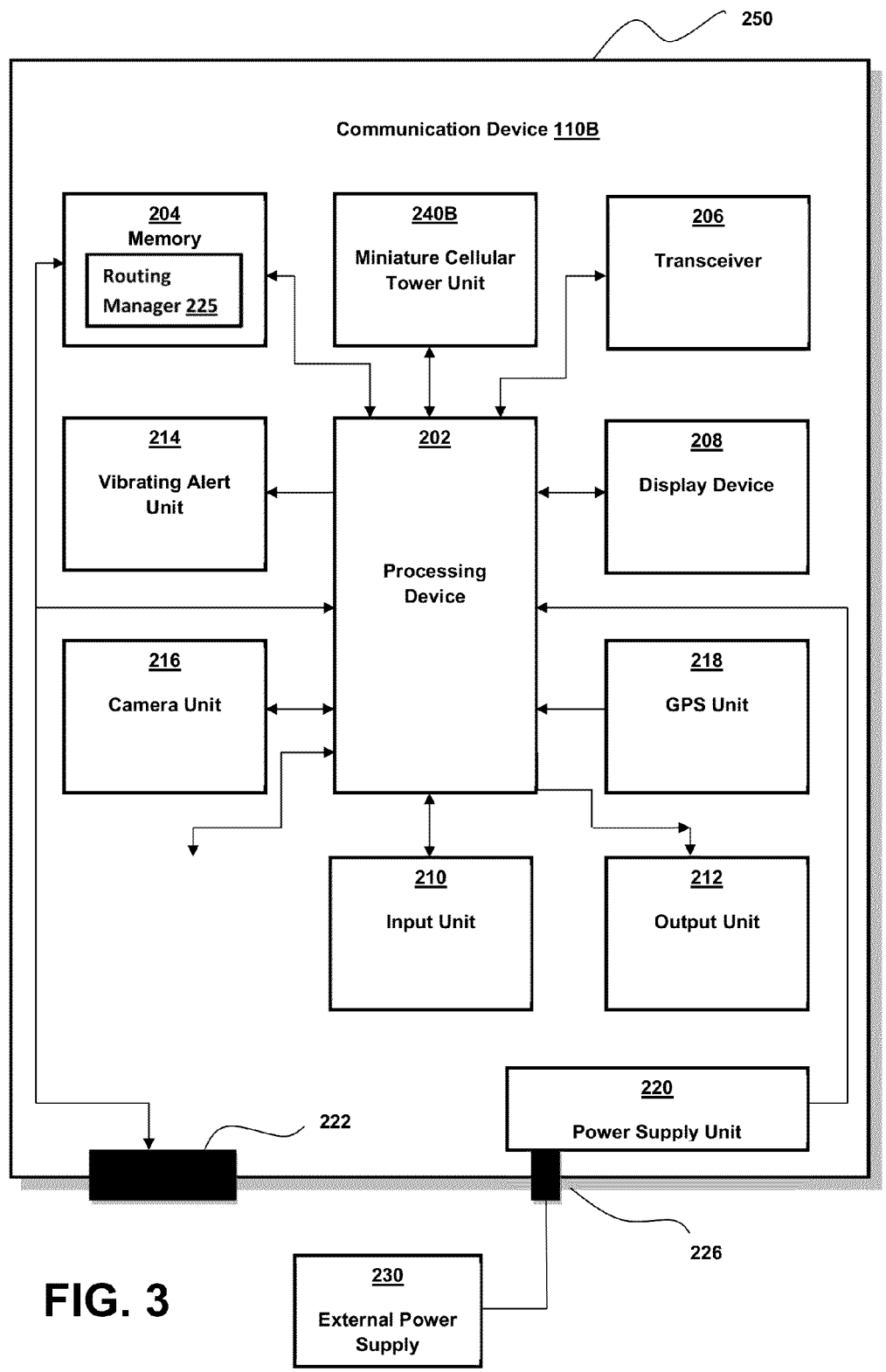
FIG. 3 is a block diagram that illustrates another embodiment of a communications device, such as that shown in FIG. 1.

FIG. 3 is a block diagram that illustrates another embodiment of a communications device 110, such as that shown in FIG. 1. In this example, the architecture of the communications device 110B of FIG. 3 is similar to the architecture of the band communications device 110 as described in FIG. 2. Like features are labeled with the same reference numbers, such as the processing device 202, memory 204, transceiver 206, display device 108, input unit 210, output unit 212, vibrating alert unit 214, camera unit 216, GPS unit 218, communications connector 222, power supply unit 220 and the external power supply 230.

In this example, the communications device 110B is configured to further include a miniature cellular tower unit 240B that is designed as part of the integrated circuits of the communications device 110B. The miniature cellular tower unit 240B is directly coupled electrically to the processing device 202 without being connected to the data ports 222, 224, such as that shown in FIG. 2. The housing 250 contains the processing device 202, memory 204, transceiver 206, and miniature cellular tower unit 240B. The miniature cellular tower unit 240B is further described below.

Figure 4:
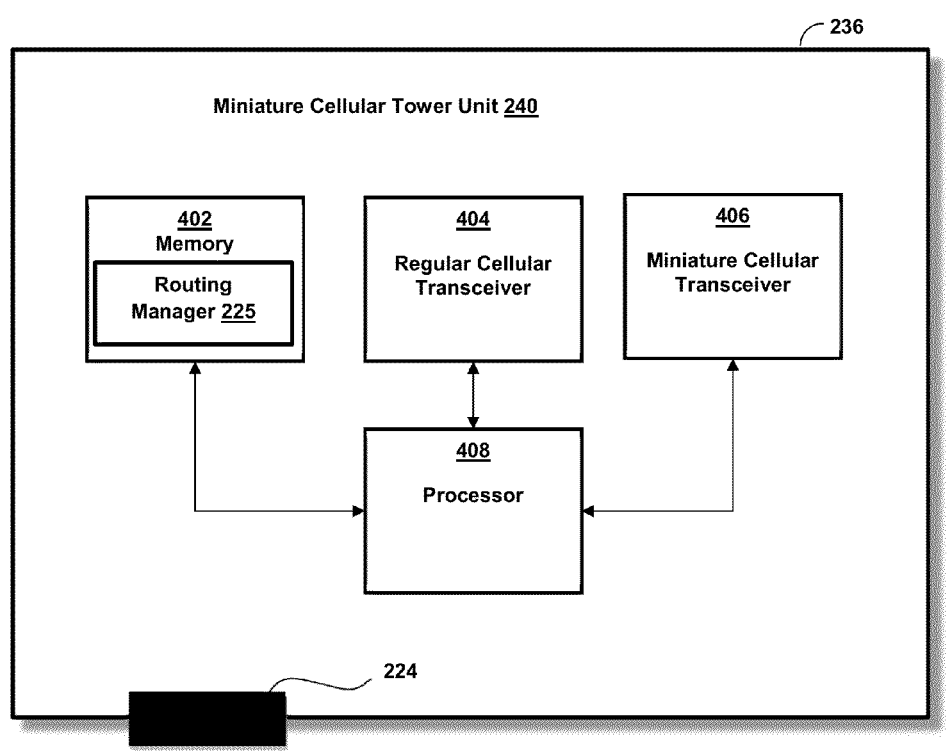
FIG. 4 is a block diagram that illustrates an embodiment of a miniature cellular tower unit, such as that shown in FIG. 1.

FIG. 4 is a block diagram that illustrates an embodiment of a miniature cellular tower unit 240, such as that shown in FIG. 1. In this example, the miniature cellular tower unit 240 includes a housing 236 that houses a regular cellular transceiver 404 and is mechanically coupled to the second data port 224. The regular cellular transceiver 404 is electrically coupled to the second data port 224. The miniature cellular tower unit 240 includes a miniature cellular transceiver 406 that facilitates routing RF signals between at least two other communications devices 110.

The miniature cellular tower unit 240 includes a processing device 408 and memory 402 including a routing manager 225 which has instructions that are executed by the processing device 408 of the miniature cellular tower unit 240. The instructions include logics that facilitate routing cellular network calls and data from and to the at least one other communications device 110. In this example, the routing manager 225 can be stored and operated at the miniature cellular tower unit 240; whereas in the previous embodiment, the routing manager 225 is stored and operated at the communications device 110, such as that shown in FIGS. 2 and 3.

The routing manager 225 routes RF signals from the at least one other communications device 110 to the cellular tower 105 (FIG. 1) during an in-use status of the communications device 110. The in-use status includes the state of the communications device operating in a telephone call or the state of the communications device operating to transmit and receive cellular network data.

Alternatively or additionally, the routing manager 225 routes the RF signals from the at least one other communications device 110 to the cellular tower 105 during an idle status of the communications device 110. The idle status includes the state of the communications device not operating in a telephone call nor transmitting and receiving cellular network data. Alternatively or additionally, the routing manager 225 determines its routing performance and provides the routing performance to the at least one other communications device 110 so that the at least one other communications device 110 can determine whether to use the communications device 110 for routing cellular networks calls and data.

Alternatively or additionally, the routing manager 225 determines that the routing of the cellular network call or data could switch off or become inaccessible. Responsive to this determination, the routing manager 225 transfers the routing responsibility of the call/data to the at least one other communications device 110 to ensure proper routing of the cellular network calls or data to the cellular network tower 105.

The routing manager 225 can determine that the cellular tower 105 are closer in distance to the communications device 110 than other communications device 110 and instructs the miniature cellular tower unit 240 to transmit, receive and route cellular voice and data packets to and from the cellular tower directly. Responsive to determining that the cellular tower 105 are farther in distance to the communications device 110 than other communications device 110, the routing manager 225 instructs the miniature cellular tower unit 240 to transmit, receive and route cellular voice and data packets to and from the cellular tower through other communications devices 110. This can reduce the number of cellular towers needed. In some cases the cellular tower is even not needed. Change in network technology infrastructure can be easily done since the communications device having the miniature cellular tower unit 240 mentioned above can be configured, designed, or reprogrammed with support to new network technology infrastructure.

Figure 5:
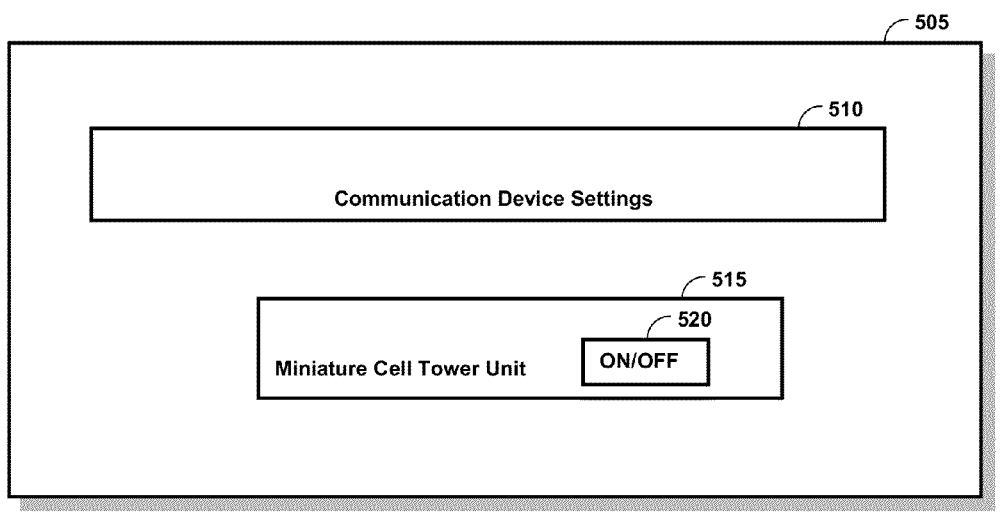
FIG. 5 is a view that illustrates an embodiment of an activation graphic user interface (GUI) that can activate a miniature cellular tower unit, such as that shown in FIG. 4.

FIG. 5 is a view that illustrates an embodiment of an activation graphic user interface (GUI) 505 that can activate a miniature cellular tower unit 240, such as that shown in FIG. 4. An activation option (not shown) of the miniature cellular tower unit 240 can be located at a settings menu (not shown) of the communications device 110. Responsive to selecting the activation option, the routing manager 225 can display the activation GUI 505 on a display (not shown) of a communications device 110. The user interface 505 facilitates activating the miniature cellular tower unit 240 for routing cellular network calls or data to the cellular tower 105 or the at least one other communications device 110.

Figure 6:
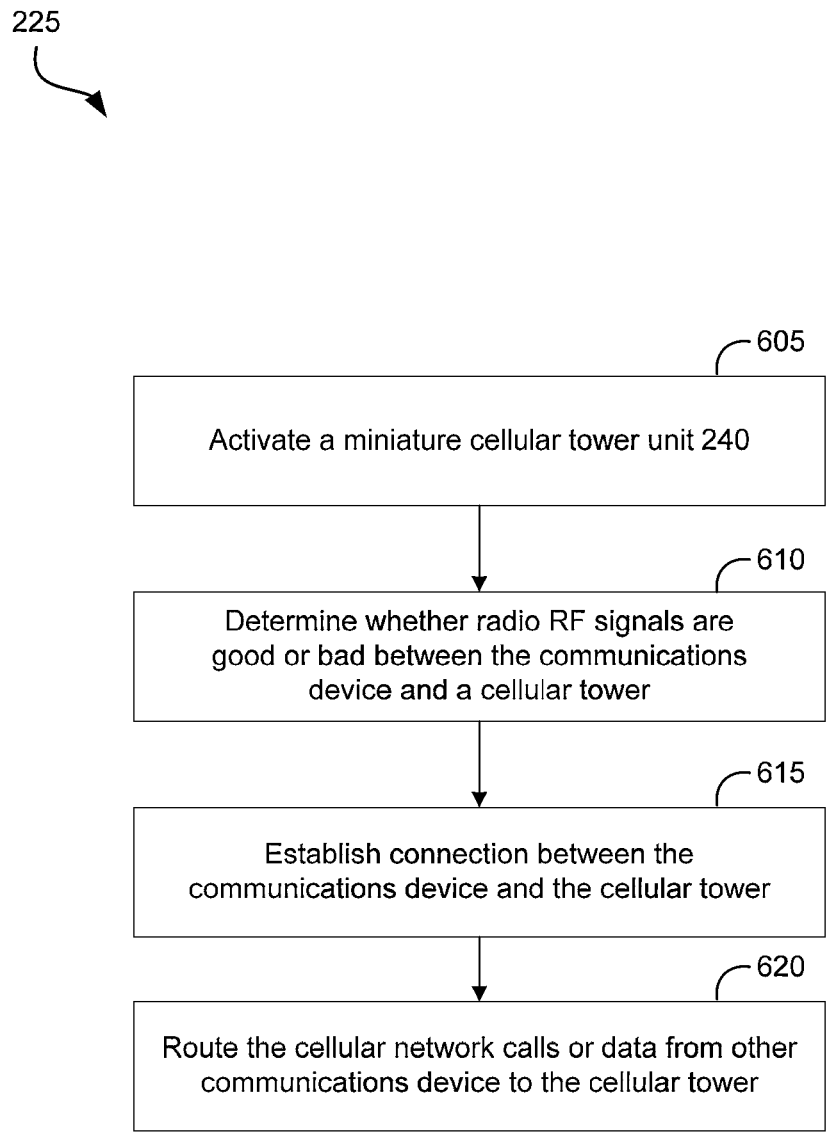
FIG. 6 is a high-level flow diagram that illustrates an embodiment of the architecture, functionality, and/or operation of a routing manager, such as that shown in FIG. 1, that facilitates routing cellular network calls or data using a communications device.

FIG. 6 is a high-level flow diagram that illustrates an embodiment of the architecture, functionality, and/or operation of a routing manager 225, such as that shown in FIG. 1, that facilitates routing cellular network calls or data using a communications device 110. Beginning with block 605, the routing manager 225 activates a miniature cellular tower unit 240 of the communications device 110 using a user interface 505 of the communications device 110. At block 610, the routing manager 225 determines whether radio frequency (RF) signals are good or bad between the communications device and a cellular tower. At block 615, responsive to the determination that the RF signals associated with the cellular network calls and cellular network data are good, the routing manager 225 establishes connection between the communications device 110 and the cellular tower 105 using the miniature cellular tower unit 240. At block 620, the routing manager 225 routes the cellular network calls or data from at least one other communications device 110 to the cellular tower 105.

Figure 7:
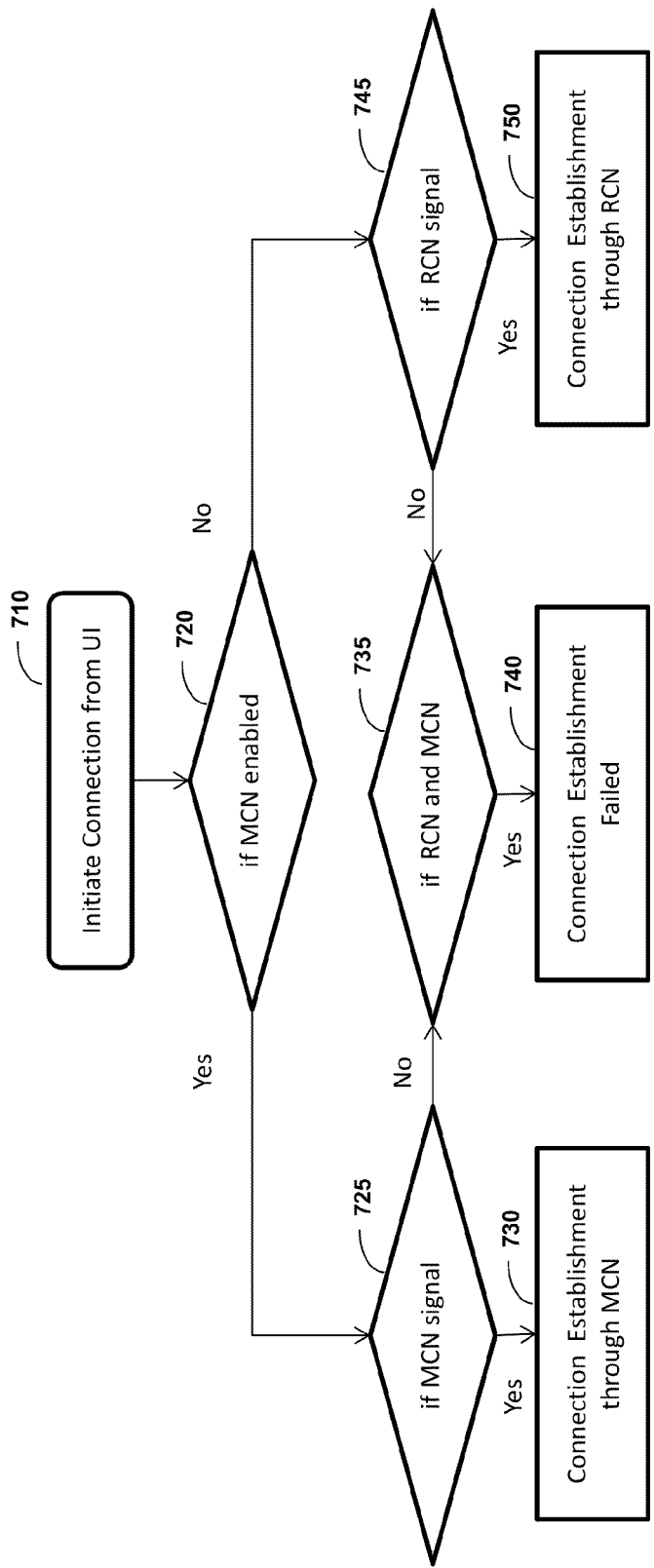
FIG. 7 is a flow diagram that illustrates an embodiment of the architecture, functionality, and/or operation of a routing manager, such as that shown in FIG. 2, that establishes connection for routing cellular calls and data.

FIG. 7 is a flow diagram that illustrates an embodiment of the architecture, functionality, and/or operation of a routing manager 225, such as that shown in FIG. 2, that establishes connection for routing cellular calls and data. Beginning at block 710, the routing manager 225 can initiates connection with a cellular network 100 (FIG. 1) based on activation GUI 505 (FIG. 5). At block 720, the routing manager 225 determines whether a miniature cellular network is enabled. If "yes" at block 720, the routing manager 225 at block 725 determines whether RF signals associated with the miniature cellular network is detected by the communications device 110. If "yes" at block 725, the routing manager 225 at block 730 establishes connection with the cellular network 100 using the miniature cellular network.

If "no" at block 725, the routing manager 225 at block 735 determines whether RF signals associated with the miniature cellular network and regular cellular network is detected by the communications device 110. If "yes" at block 735, the routing manager 225 at block 740 disconnects the connection with the cellular network 100 using the miniature cellular network.

If "no" at block 735 or at block 720, the routing manager 225 at block 745 determines whether RF signals associated with the regular cellular network is detected by the communications device 110. If "yes" at block 750, the routing manager 225 at block 750 establishes connection with the cellular network 100 using the regular cellular network.

Figure 8:
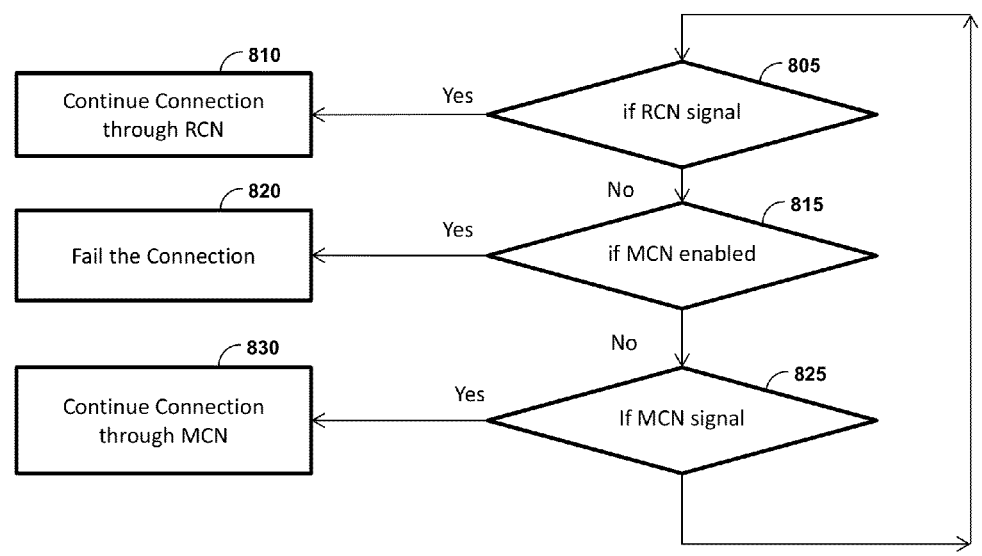
FIG. 8 is a flow diagram that illustrates an embodiment of the architecture, functionality, and/or operation of a routing manager, such as that shown in FIG. 2, that routes cellular calls and data during regular cellular connection.

FIG. 8 is a flow diagram that illustrates an embodiment of the architecture, functionality, and/or operation of a routing manager 225, such as that shown in FIG. 2, that routes cellular calls and data during regular cellular connection. Beginning at block 805, the routing manager 225 determines whether RF signals associated with the regular cellular network is detected by the communications device 110. If "yes" at block 805, the routing manager 225 at block 810 continues to maintain connection with the cellular network 100 using the miniature cellular network.

If "no" at block 805, the routing manager 225 at block 815 determines whether RF signals associated with the miniature cellular network is detected by the communications device 110. If "yes" at block 815, the routing manager 225 at block 820 disconnects the connection with the cellular network 100.

If "no" at block 815, the routing manager 225 at block 825 determines whether RF signals associated with the miniature cellular network is detected by the communications device 110. If "yes" at block 825, the routing manager 225 at block 830 continues to maintain connection with the cellular network 100 using the miniature cellular network.

Figure 9:
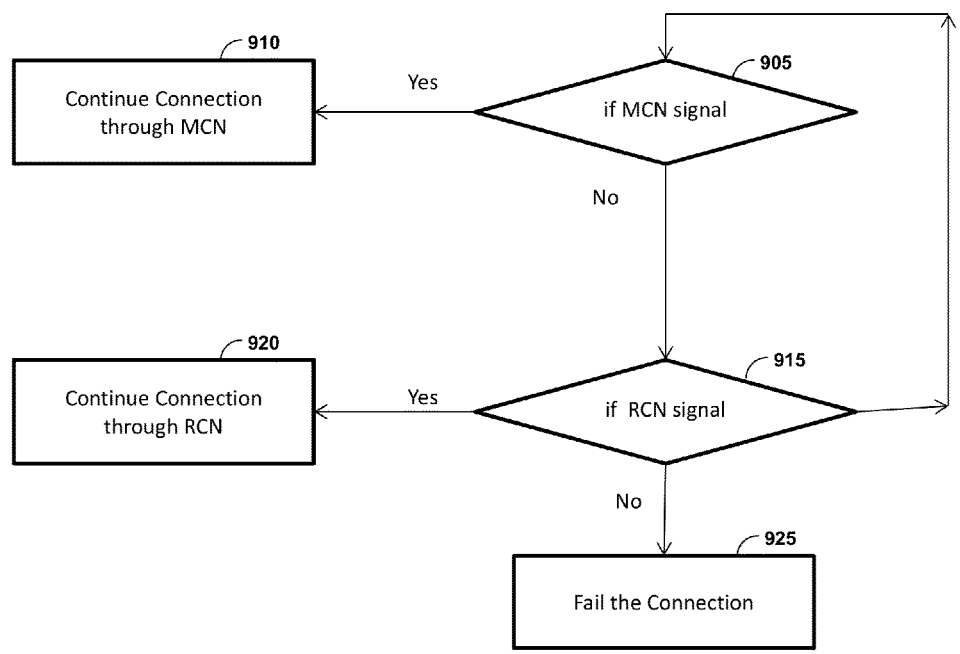
FIG. 9 is a flow diagram that illustrates an embodiment of the architecture, functionality, and/or operation of a routing manager, such as that shown in FIG. 2, that routes cellular calls and data during miniature cellular connection.

FIG. 9 is a flow diagram that illustrates an embodiment of the architecture, functionality, and/or operation of a routing manager 225, such as that shown in FIG. 2, that routes cellular calls and data during miniature cellular connection. Beginning at block 905, the routing manager 225 determines whether RF signals associated with the miniature cellular network is detected by the communications device 110. If "yes" at block 905, the routing manager 225 at block 910 continues to maintain connection with the cellular network 100 using the miniature cellular network.

If "no" at block 905, the routing manager 225 at block 915 determines whether RF signals associated with the regular cellular network is detected by the communications device 110. If "yes" at block 915, the routing manager 225 at block 920 continues to maintain connection with the cellular network 100 using the miniature cellular network. If "no" at block 915, the routing manager 225 at block 925 disconnects the connection with the cellular network 100.

Figure 10:
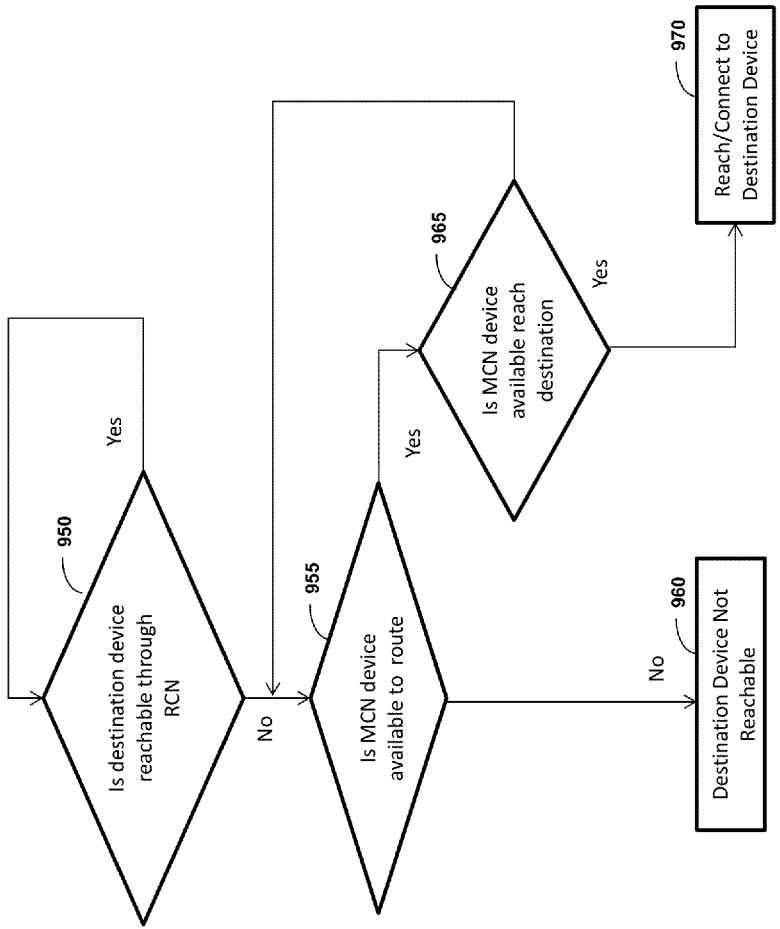
FIG. 10 is a high-level flow diagram that illustrates an embodiment of the architecture, functionality, and/or operation of a routing manager, such as that shown in FIG. 1, that routes cellular calls and data during miniature cellular connection.

FIG. 10 is a high-level flow diagram that illustrates an embodiment of the architecture, functionality, and/or operation of a routing manager 225, such as that shown in FIG. 1, that routes cellular calls and data during miniature cellular connection. Beginning at block 905, the routing manager 225 determines whether a destination communications device 110 is reachable through the regular cellular network. If "yes" at block 950, the routing manager 225 at block 950 continues to maintain connection with the cellular network 100 using the miniature cellular network.

If "no" at block 950, the routing manager 225 at block 915 determines whether a communications device 110 having, for example, a miniature cellular tower unit 224 is available to route calls and data through the miniature cellular network. If "yes" at block 955, the routing manager 225 at block 965 determines whether a destination communications device 110 having, for example, a miniature cellular tower unit 224 is available to be reached to receive calls and data through the miniature cellular network. If "no" at block 965, the routing manager 225 at block 960 determines that a destination communications device 110 cannot be reached through the miniature cellular network and stops transmitting calls and data through the miniature cellular network and can then starts transmitting calls and data through the regular cellular network.

If "yes" at block 965, the routing manager 225 at block 920 determines that a destination communications device 110 can be reached through the miniature cellular network and starts transmitting calls and data through the miniature cellular network. If "no" at block 965, the routing manager 225 repeats block 955.

FIG. 11 is a block diagram illustrating an exemplary architecture for a generic computer 1100 that is similar to the architecture of the computing device, local server and central server, such as that shown in FIG. 5. As indicated in FIG. 11, the computing generic computer 1100 comprises a processing device 1110, memory 1115, one or more user interface devices 1120, one or more I/O devices 1130, and one or more networking devices 1140, each of which is connected to a local interface 1150. The processing device 1110 can include any custom made or commercially available processor, a central processing unit (CPU) or an auxiliary processor among several processors associated with the generic computer 1100, a semiconductor based microprocessor (in the form of a microchip), or a macroprocessor. The memory 1115 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 1120 comprise those components with which the user (e.g., administrator) can interact with the generic computer 1100. Where the generic computer 1100 comprises a server computer or similar device, these components can comprise those typically used in conjunction with a PC such as a keyboard and mouse.

The one or more I/O devices 1130 comprise components used to facilitate connection of the generic computer 1100 to other devices and therefore, for instance, comprise one or more serial, parallel, small system interface (SCSI), universal serial bus (USB), or IEEE 1394 (e.g., Firewire™) connection elements. The networking devices 1140 comprise the various components used to transmit and/or receive data over networks, where provided. By way of example, the networking devices 1140 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 1115 normally comprises various programs (in software and/or firmware) including an operating system (O/S) (not shown) and routing manager 125. The O/S controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

As described herein, an improved method, system and apparatus for providing cellular network coverage and establishing a new cellular network technology infrastructure are presented utilizing a miniature cellular tower unit. This approach takes advantage of the large number of people using smartphones. Due to this there is an increased usage, high demand and high cost to set up infrastructure for evolving new cellular standards. Also, the consumers are affected by low quality due to slow roll-out of network infrastructure and due to congestion. The invention provides a solution to cellular carrier operators by rolling out a new device with a built-in miniature cellular tower unit or external add-on miniature cellular tower unit whenever a new communication devices is released or network standard is released. This way just like how the new devices are adopted, the new infrastructure will also get adopted with minimal cost to the cellular network operators. Also the customers can benefit with better network and connectivity. The cellular network operators can also redeem the customers points/cash etc whenever the miniature cellular tower unit in the customer's communication device participates in routing a connection between any other devices.

Therefore, having thus described the disclosure, at least the following is claimed:

1. A mobile communications device comprising: a processing device; memory including a network manager which has instructions that are executed by the processing device, the instructions including logics that facilitate making and receiving cellular network calls from and to the mobile communications device; a cellular transceiver that wirelessly transmits and receives radio frequency (RF) signals to and from a cellular tower and to and from at least one other mobile communications device; and a miniature cellular tower unit of the mobile communications device includes a second cellular transceiver that wirelessly routes RF signals from the at least one other mobile communications device to the cellular tower, wherein the routed RF signals are associated with the cellular network calls and cellular network data; and the routing is performed also during an idle status of the mobile communications device, wherein the idle status includes a state of the mobile communications device not operating in the cellular network calls or not transmitting and receiving cellular network data.

2. The communications device as defined in claim 1, wherein the miniature cellular tower unit routes RF signals from the at least one other communications device to the cellular tower during an in-use status of the communications device, wherein the in-use status includes the state of the communications device operating in a telephone call.

3. The communications device as defined in claim 1, wherein the miniature cellular tower unit routes the RF signals from the at least one other communications device to the cellular tower during an in-use status of the communications device, wherein the in-use status includes the state of the communications device operating to transmit and receive cellular network data.

4. The communications device as defined in claim 1, wherein the miniature cellular tower unit routes the RF signals from the at least one other communications device to the cellular tower during an idle status of the communications device, wherein the idle status includes the state of the communications device not operating in a telephone call nor transmitting and receiving cellular network data.

5. The communications device as defined in claim 1, further comprising a housing that contains the processing device, memory, the transceiver, and the miniature cellular tower unit.

6. The communications device as defined in claim 1, wherein the miniature cellular tower unit includes a regular cellular transceiver that facilitates routing RF signals from the at least one other communications device to the cellular tower.

7. The communications device as defined in claim 6, wherein the miniature cellular tower unit includes a housing that houses the regular cellular transceiver and is mechanically coupled to a second data port, wherein the second data port is electrically coupled to the regular cellular transceiver, wherein the communications device includes a first data port that is electrically coupled to the memory and processing device of the communications device and connects to the second data port of the miniature cellular tower unit using a data cable.

8. The communications device as defined in claim 6, wherein the miniature cellular tower unit includes a miniature cellular transceiver that facilitates routing RF signals between at least two other communications devices.

9. The communications device as defined in claim 8, wherein the miniature cellular tower unit includes:
a processing device; and
memory including a cellular routing manager which has instructions that are executed by the processing device of the miniature cellular tower unit, the instructions including logics that facilitate routing cellular network calls and data from and to the at least one other communications device.

10. The communications device as defined in claim 1, wherein the miniature cellular tower unit determines its routing performance and provides the routing performance to the at least one other communications device so that the at least one other communications device can determine whether to use the communications device for routing cellular networks calls and data.

11. The communications device as defined in claim 1, wherein the miniature cellular tower unit determines that the routing of the cellular network call or data could switch off or become inaccessible and responsive to this determination, the miniature cellular tower unit transfers the routing responsibility of the call/data to the at least one other communications device to ensure proper routing of the cellular network calls or data to the cellular network tower.

12. The communications device as defined in claim 1, further comprising a user interface that facilitates activating the miniature cellular tower unit for routing cellular network calls or data to the cellular tower or the at least one other communications device.

13. A method for routing cellular network calls or data using a mobile communications device, the method comprising: activating a miniature cellular tower unit of the mobile communications device including a second cellular transceiver different from a cellular transceiver of the mobile communication device used for transmitting and receiving radio frequency (RF) signals to and from a cellular tower and to and from at least one other mobile communications device, using a user interface of the mobile communications device; determining whether radio frequency (RF) signals are good or bad between the mobile communications device and a cellular tower; responsive to the determination that the RF signals associated with the cellular network calls and cellular network data are good, establishing wireless connection between the mobile communications device and the cellular tower using the miniature cellular tower unit; and the miniature cellular tower unit wirelessly routing the cellular network calls or data from at least one other mobile communications device to the cellular tower, wherein the routed RF signals are associated with the cellular network calls and cellular network data; and the routing is performed also during an idle status of the mobile communications device, wherein the idle status includes a state of the mobile communications device not operating in the cellular network calls or not transmitting and receiving cellular network data.

14. The method as defined in claim 13, further comprising routing the RF signals from the at least one other communications device to the cellular tower using the miniature cellular tower during an in-use status of the communications device, wherein the in-use status includes the state of the communications device operating in a telephone call.

15. The method as defined in claim 13, further comprising routing the RF signals from the at least one other communications device to the cellular tower using the miniature cellular tower unit during an in-use status of the communications device, wherein the in-use status includes the state of the communications device operating to transmit and receive cellular network data.

16. The method as defined in claim 13, further comprising routing the RF signals from the at least one other communications device to the cellular tower using the miniature cellular tower unit during an idle status of the communications device, wherein the idle status includes the state of the communications device not operating in a telephone call nor transmitting and receiving cellular network data.

17. The method as defined in claim 13, further comprising:
determining a routing performance of the miniature cellular tower unit; and
providing the routing performance to the at least one other communications device so that the at least one other communications device can determine whether to use the communications device for routing cellular networks calls and data.

18. The method as defined in claim 13, further comprising:

determining by the miniature cellular tower unit that the routing of the cellular network call or data could switch off or become inaccessible; and responsive to this determination, transferring the routing responsibility of the call/data by the miniature cellular tower unit to the at least one other communications device to ensure proper routing of the cellular network calls or data to the cellular network tower.

19. A cellular network infrastructure comprising: a cellular tower; and at least one mobile communications device comprising: a processing device; memory including a network manager which has instructions that are executed by the processing device, the instructions including the logics that facilitate making and receiving cellular network calls from and to the mobile communications device; a cellular transceiver that wirelessly transmits and receives radio frequency (RF) signals to and from a cellular tower and to and from at least one other mobile communications device; and a miniature cellular tower unit of the mobile communications device including a second cellular transceiver that wirelessly routes RF signals from the at least one other mobile communications device to the cellular tower, wherein the routed RF signals are associated with the cellular network calls and cellular network data; and the routing is performed also during an idle status of the mobile communications device, wherein the idle status includes a state of the mobile communications device not operating in the cellular network calls or not transmitting and receiving cellular network data.

\* \* \* \* \*